US009821689B2

(12) United States Patent
Busboom et al.

(10) Patent No.: US 9,821,689 B2
(45) Date of Patent: Nov. 21, 2017

(54) OPERATOR PLATFORM SUSPENSION SYSTEM FOR TURF MAINTENANCE VEHICLE

(71) Applicant: Exmark Manufacturing Company, Incorporated, Beatrice, NE (US)

(72) Inventors: Garry W. Busboom, Beatrice, NE (US); Nicholas R. Hiser, Seward, NE (US); C. Mark Atterbury, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 23 days.

(21) Appl. No.: 14/989,198

(22) Filed: Jan. 6, 2016

(65) Prior Publication Data

US 2017/0190270 A1    Jul. 6, 2017

(51) Int. Cl.
*B60N 2/42* (2006.01)
*B60N 2/38* (2006.01)
(Continued)

(52) U.S. Cl.
CPC ............... *B60N 2/42* (2013.01); *A01D 34/64* (2013.01); *A01D 34/82* (2013.01); *B60N 2/38* (2013.01);
(Continued)

(58) Field of Classification Search
CPC .......... B60N 2/38; B60N 2/42; B60N 2/4207; B60N 2/4242; B60N 2/50; B60N 2/502; B60N 2/542; B62D 33/0604
(Continued)

(56) References Cited

U.S. PATENT DOCUMENTS 2,303,567 A    12/1942  McWhorter et al.
2,531,572 A    11/1950  Knoedler
(Continued)

FOREIGN PATENT DOCUMENTS

EP    0 081 313 A1    6/1983
EP    0 426 510 A1    5/1991
(Continued)

OTHER PUBLICATIONS

U.S. Appl. No. 15/164,219, filed May 25, 2016, Exmark Mfg. Co., Inc.
(Continued)

*Primary Examiner* — Jason S Daniels
(74) *Attorney, Agent, or Firm* — Mueting, Raasch & Gebhardt, P.A.

(57) ABSTRACT

An adjustable suspension system for an operator platform that is pivotally attached at a pivot axis to a chassis of a turf maintenance vehicle. The system may include a suspension apparatus selectively attachable either to a support area of the chassis, or to the platform such that the apparatus is located between the support area and the platform. The suspension apparatus may be attachable at either a first location or a second location, wherein the suspension apparatus is spaced-apart from the pivot axis: by a first distance when in the first location; and by a second distance, different than the first distance, when in the second location. The suspension apparatus may include a support member and resilient element(s) attached to the support member.

25 Claims, 7 Drawing Sheets

(51) Int. Cl.
*A01D 34/64* (2006.01)
*A01D 34/82* (2006.01)
*B60N 2/50* (2006.01)
*B60N 2/54* (2006.01)
*A01D 101/00* (2006.01)

(52) U.S. Cl.
CPC ............. *B60N 2/502* (2013.01); *B60N 2/542* (2013.01); *A01D 2101/00* (2013.01)

(58) Field of Classification Search
USPC ............................ 296/65.02, 190.05, 190.07
See application file for complete search history.

(56) References Cited

U.S. PATENT DOCUMENTS

| | | | |
|---|---|---|---|
| 2,538,954 A | 1/1951 | Efromson et al. | |
| 2,573,077 A | 10/1951 | White et al. | |
| 2,707,986 A | 5/1955 | Johnson | |
| 2,800,948 A | 7/1957 | Omon et al. | |
| 2,829,703 A | 4/1958 | Knoedler | |
| 2,868,273 A | 1/1959 | Barrett | |
| 2,900,161 A | 8/1959 | Crede | |
| 2,911,207 A | 11/1959 | Coble, Jr. et al. | |
| 2,987,291 A | 6/1961 | Dyson | |
| 2,991,970 A | 7/1961 | White et al. | |
| 3,006,593 A | 10/1961 | Plate et al. | |
| 3,177,962 A | 4/1965 | Bailey | |
| 3,358,958 A | 12/1967 | Russa | |
| 3,420,568 A | 1/1969 | Henriksson et al. | |
| 3,732,941 A | 5/1973 | Davis et al. | |
| 3,770,235 A | 11/1973 | Klapproth et al. | |
| 3,788,412 A | 1/1974 | Vincent | |
| 3,994,469 A | 11/1976 | Swenson et al. | |
| 4,057,214 A | 11/1977 | Harder, Jr. | |
| 4,062,585 A | 12/1977 | Herring, Jr. | |
| 4,141,429 A | 2/1979 | Hale | |
| 4,215,841 A | 8/1980 | Herring, Jr. | |
| 4,235,471 A | 11/1980 | Tengler | |
| 4,286,777 A | 9/1981 | Brown | |
| 4,291,857 A | 9/1981 | Totten et al. | |
| 4,311,204 A | 1/1982 | Shupert | |
| 4,351,556 A | 9/1982 | Worringer | |
| 4,392,546 A | 7/1983 | Brown et al. | |
| 4,429,427 A | 2/1984 | Sklar | |
| 4,477,050 A | 10/1984 | Thompson et al. | |
| 4,537,382 A | 8/1985 | Beck | |
| 4,662,597 A | 5/1987 | Uecker et al. | |
| 4,711,423 A | 12/1987 | Popper | |
| 4,944,554 A | 7/1990 | Gross et al. | |
| 5,367,864 A | 11/1994 | Ogasawara et al. | |
| 5,368,118 A | 11/1994 | Hoefle | |
| 5,769,492 A | 6/1998 | Jensen | |
| 5,799,475 A | 9/1998 | Borling et al. | |
| 5,873,224 A | 2/1999 | Murakawa et al. | |
| 5,876,085 A * | 3/1999 | Hill ...................... | B60N 2/542 296/65.02 |
| 5,915,662 A | 6/1999 | Itakura et al. | |
| 5,946,893 A | 9/1999 | Gordon | |
| 6,019,422 A | 2/2000 | Taormino et al. | |
| 6,042,093 A | 3/2000 | Garelick | |
| 6,062,333 A | 5/2000 | Gordon | |
| 6,170,242 B1 | 1/2001 | Gordon | |
| 6,244,025 B1 | 6/2001 | Ferris et al. | |
| 6,394,216 B1 | 5/2002 | Gordon | |
| 6,460,318 B1 | 10/2002 | Ferris et al. | |
| 6,510,678 B2 | 1/2003 | Ferris et al. | |
| 6,572,071 B1 | 6/2003 | Tsai | |
| 6,669,293 B2 | 12/2003 | Moore | |
| 6,688,689 B1 | 2/2004 | Thorn | |
| 6,698,172 B2 | 3/2004 | Ferris et al. | |
| 6,711,885 B2 | 3/2004 | Ferris | |
| 6,719,258 B2 | 4/2004 | Bryngelson et al. | |
| 6,857,254 B2 | 2/2005 | Melone et al. | |
| 6,866,340 B1 | 3/2005 | Robertshaw | |
| 6,988,703 B2 | 1/2006 | Ropp | |
| 7,044,553 B2 | 5/2006 | Ropp | |
| 7,107,746 B2 | 9/2006 | Melone et al. | |
| 7,152,389 B2 | 12/2006 | Melone et al. | |
| 7,374,187 B2 | 5/2008 | Melone et al. | |
| 7,882,914 B2 | 2/2011 | Scheele et al. | |
| 7,930,813 B2 | 4/2011 | Melone et al. | |
| 7,942,224 B2 | 5/2011 | Marshall et al. | |
| 7,967,282 B2 | 6/2011 | Boyd et al. | |
| 8,033,354 B2 | 10/2011 | Marshall et al. | |
| 8,065,864 B2 | 11/2011 | Melone et al. | |
| 8,146,899 B2 | 4/2012 | Hiser | |
| 8,186,475 B2 | 5/2012 | Sugden et al. | |
| 8,220,577 B2 | 7/2012 | Marshall et al. | |
| 8,245,806 B2 | 8/2012 | Newell | |
| 8,397,367 B2 | 3/2013 | Melone et al. | |
| 9,499,204 B1 | 11/2016 | Gust et al. | |
| 2001/0013217 A1 | 8/2001 | Ferris | |
| 2003/0024223 A1 | 2/2003 | Jager et al. | |
| 2005/0082897 A1 | 4/2005 | Ropp et al. | |
| 2005/0279910 A1 | 12/2005 | Huprikar et al. | |
| 2005/0285006 A1 | 12/2005 | Koutsky et al. | |
| 2006/0131799 A1 | 6/2006 | Carlitz et al. | |
| 2008/0202874 A1 | 8/2008 | Scheele et al. | |
| 2012/0049039 A1 | 3/2012 | Scheffler et al. | |
| 2013/0291508 A1 | 11/2013 | Melone et al. | |
| 2013/0291509 A1 | 11/2013 | Weber et al. | |
| 2015/0040531 A1 | 2/2015 | Melone et al. | |
| 2016/0031492 A1 | 2/2016 | Suzuki et al. | |
| 2016/0325784 A1 | 11/2016 | Gust et al. | |

FOREIGN PATENT DOCUMENTS

| | | |
|---|---|---|
| EP | 1 645 494 A2 | 4/2006 |
| GB | 774129 A | 5/1957 |
| JP | 55-69340 A | 5/1980 |
| WO | WO 2006/080495 A1 | 8/2006 |

OTHER PUBLICATIONS

"Bonded Tube Mounts: HR Series." Product Datasheet [online]. Barry Controls [retrieved Apr. 28, 2008]. Retrieved from the Internet: <URL:www.barrycontrols.com/defenseandindustrial/productselectionguide/data/HRSeries.aspx>; 1 page.

"Grasshopper 620T OPS (Operator Protective Structure) and Seat Assembly." Parts Diagram [online]. The Mower Shop, Inc. 2007 [retrieved Sep. 9, 2015]. Retrieved from the Internet: <URL:www.the-mower-shop-inc.com/620t_2007_ops_seat_assembly.aspx>; 4 pages.

"Case IH Steiger Cab Suspension." Product Listing [online]. CASE iH Agriculture, 2011 [retrieved Sep. 9, 2015]. Retrieved from the Internet: <URL:beready.caseih.com/available-land/the-new-steiger-tractor-cab-you-asked-for-it-you-got-it/attachment/steiger_cab_suspension_words_flat-2/>; 4 pages (including enlarged image from p. 1).

"5400 Series Cab Suspension." Brochure [online]. Massey Ferguson, 2010 [retrieved on Aug. 8, 2015]. Retrieved from the Internet: <URL: http://www.masseyferguson.us/content/dam/Brands/Massey%20Ferguson/US/Literature/massey-ferguson-5400-cab-suspension-tractor-brochure-english.pdf/_jcr_content/renditions/original>; 4 pages.

"A Better Way—Rebound and Terrain Jockey." Unknown publisher. Available on or before Mar. 17, 2014, 1 page.

"Valtra N Series: HiTech/ HiTech 5/ Versu/Direct, 99-171 HP." Brochure [online]. Valtra Inc., 2013 [retrieved on Aug. 17, 2015]. Retrieved from the Internet: <URL:www.valtra.com/downloads/ValtraNSeriesEN_2013.pdf; 48 pages.

"Skiroule Snowmobile—RT & RTX Series II" Owner's Manual and Maintenance Guide, Form No. 3213-9001, Skiroule Coleman. Printed in Canada circa 1973; 38 pages.

* cited by examiner

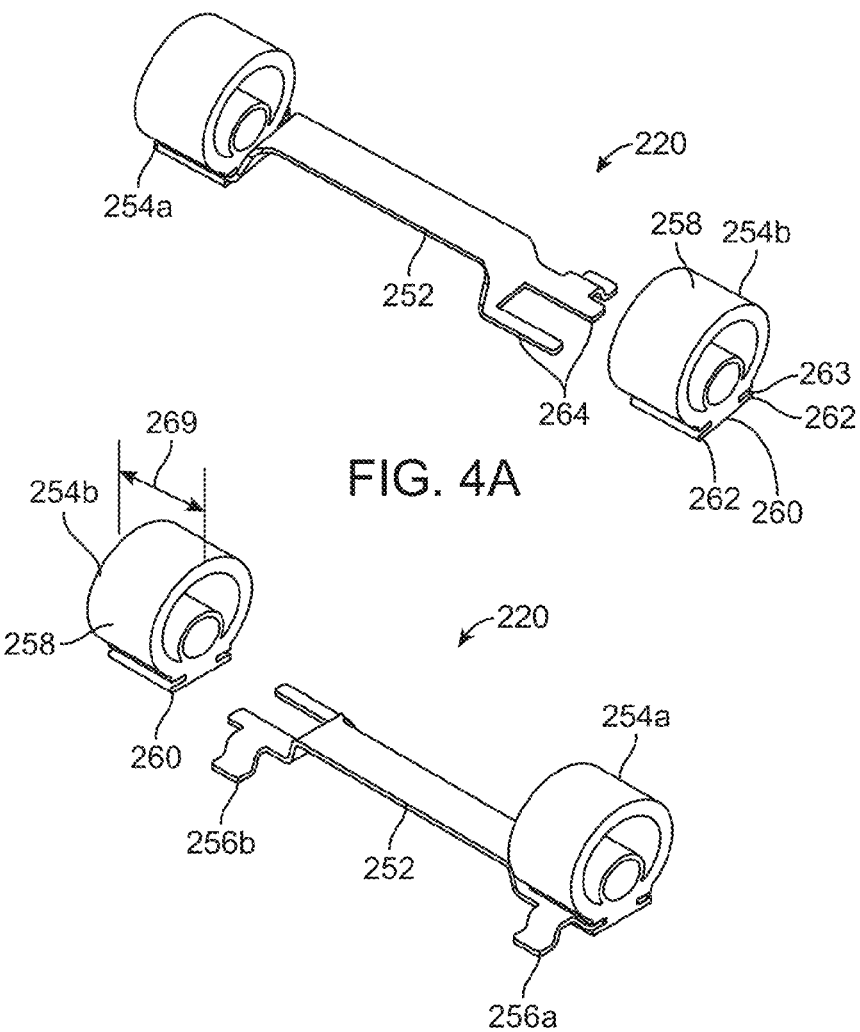
FIG. 4A
FIG. 4B
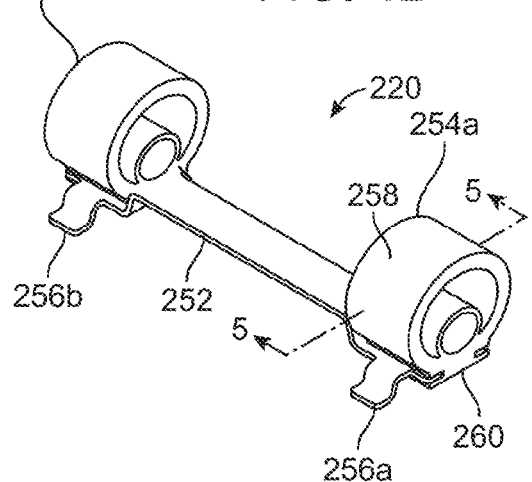
FIG. 4C

OPERATOR PLATFORM SUSPENSION SYSTEM FOR TURF MAINTENANCE VEHICLE

Embodiments of the present disclosure relate generally to suspension systems and, more particularly, to operator platform suspension systems and to turf maintenance vehicles incorporating same.

BACKGROUND

Riding turf maintenance vehicles such as lawn mowers, fertilizer spreaders/sprayers, and the like are known. Such vehicles may include a chassis supported for movement over a ground surface by ground engaging members such as wheels. During vehicle operation over undulating terrain, various forces may be imparted to the chassis and ultimately be transmitted to the riding operator. While the magnitude and/or duration of such forces may be minimal in some instances, traversal of rough terrain may undesirably expose the operator to repetitive and/or jarring forces.

It is known to provide vehicle seat suspension systems that seek to attenuate these forces. While effective, some of these suspension systems are non-adjustable, e.g., they may not be able to achieve desired suspension characteristics across a range of expected operator weights. Alternatively, systems that are adjustable are sometimes complicated. As a result, operators may not always make desirable suspension adjustments. Still further, depending on the configuration (e.g., simple, spring-based systems), some seat suspension systems may provide little or no damping.

SUMMARY

Embodiments described herein may provide a suspension system that addresses these and other problems. For example, in one embodiment, a riding turf maintenance vehicle may be provided that includes: a chassis having a support area, the support area having a front end, a rear end, and a longitudinal axis extending between the front and rear ends; and an operator platform including first and second edges spaced-apart from one another along the longitudinal axis, wherein the platform is pivotally connected to the chassis at a pivot axis. A suspension apparatus is also included and selectively attachable, either to the support area or to the platform, at either a first location or a second location. The suspension apparatus includes a support member comprising couplers adapted to attach the suspension apparatus at the first location or at the second location. The suspension apparatus further includes two resilient elements attached to the support member such that, when the suspension apparatus is attached to the support area or to the platform and the platform is in an operating position, the resilient elements are interposed between the support area and the platform. The resilient elements are spaced-apart from the pivot axis: by a first distance when the suspension apparatus is in the first location; and by a second distance, different than the first distance, when the suspension apparatus is in the second location.

In another embodiment, a riding turf maintenance vehicle is provided that includes: a chassis comprising a support area having a front end, a rear end, and a longitudinal axis extending between the front and rear ends; and an operator platform including a seat positioned above the support area when the platform is in an operating position. The platform also includes a front edge located proximate the front end of the support area, wherein the front edge of the platform is pivotally connected to the support area at a pivot axis parallel to the front edge such that the platform may pivot about the pivot axis. The vehicle also includes a suspension apparatus selectively attachable to the support area at any one of a plurality of discrete locations including at least a first and a second location. The suspension apparatus includes: an elongate, transversely extending support member adapted to engage the support area to secure the suspension apparatus at any one of the plurality of discrete locations; and resilient first and second tubular elements attached to outermost ends of the support member, the first and second tubular elements defining a transverse, common tube axis that is also parallel to the pivot axis. When the suspension apparatus is attached to the support area at any one of the plurality of discrete locations and the platform is in the operating position, the first and second tubular elements are interposed between the support area and the platform. Moreover, the common tube axis of the first and second tubular elements is spaced-apart from the pivot axis: by a first distance when the suspension apparatus is in the first location; and by a second distance, different than the first distance, when the suspension apparatus is in the second location.

In yet another embodiment, a riding turf maintenance vehicle is provided that includes: a chassis comprising a support area having a front end, a rear end, and a longitudinal axis extending between the front and rear ends; and an operator platform including a seat positioned above the support area when the platform is in an operating position, the seat defining a seat index point (SIP). The platform further includes: a front edge located proximate the front end of the support area, wherein the front edge is pivotally connected to the support area at a pivot axis parallel to the front edge such that the platform may pivot about the pivot axis. A suspension apparatus is also provided and includes a resilient element. The suspension apparatus is attachable to the support area at either a first location or a second location, each location being at a different longitudinal distance from the pivot axis. When the apparatus is in the first location with a 120 pound-force seat load, the suspension apparatus is adapted to provide a static vertical deflection, at the SIP, of 0.5 inches, and a total dynamic vertical deflection, at the SIP, of 1.5 inches when the vehicle is subjected to a vertical shock load of 4 g. Moreover, when the apparatus is at the second location with a 300 pound-force seat load, the suspension apparatus is adapted to provide a static vertical deflection, at the SIP, of 0.5 inches, and a total dynamic vertical deflection, at the SIP, of 1.5 inches when the vehicle is subjected to a vertical shock load of 4 g.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
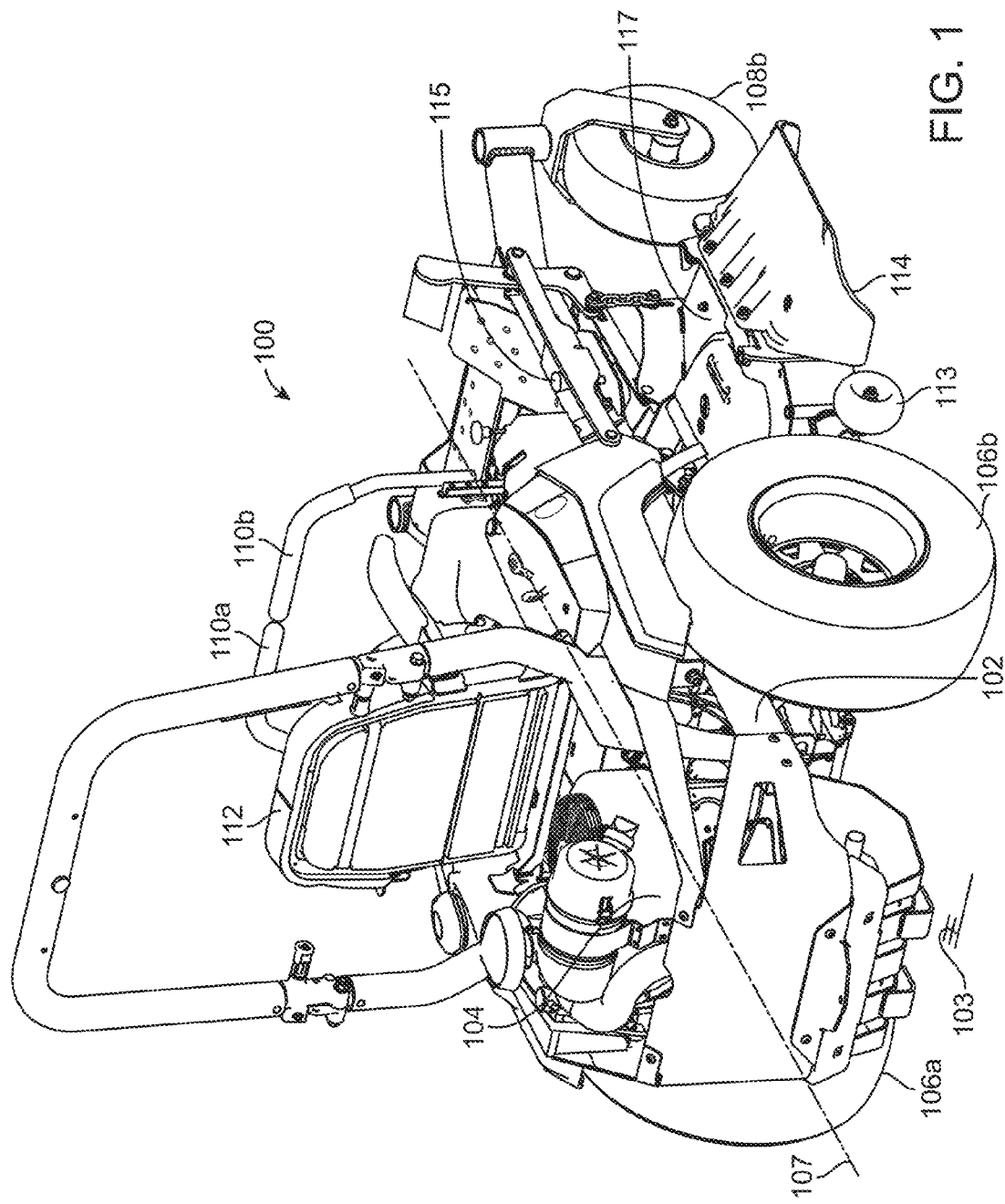
FIG. 1 is a rear perspective view of a turf maintenance vehicle (e.g., riding lawn mower) incorporating an operator platform (e.g., seat) suspension system in accordance with embodiments of the present disclosure.
Figure 2:
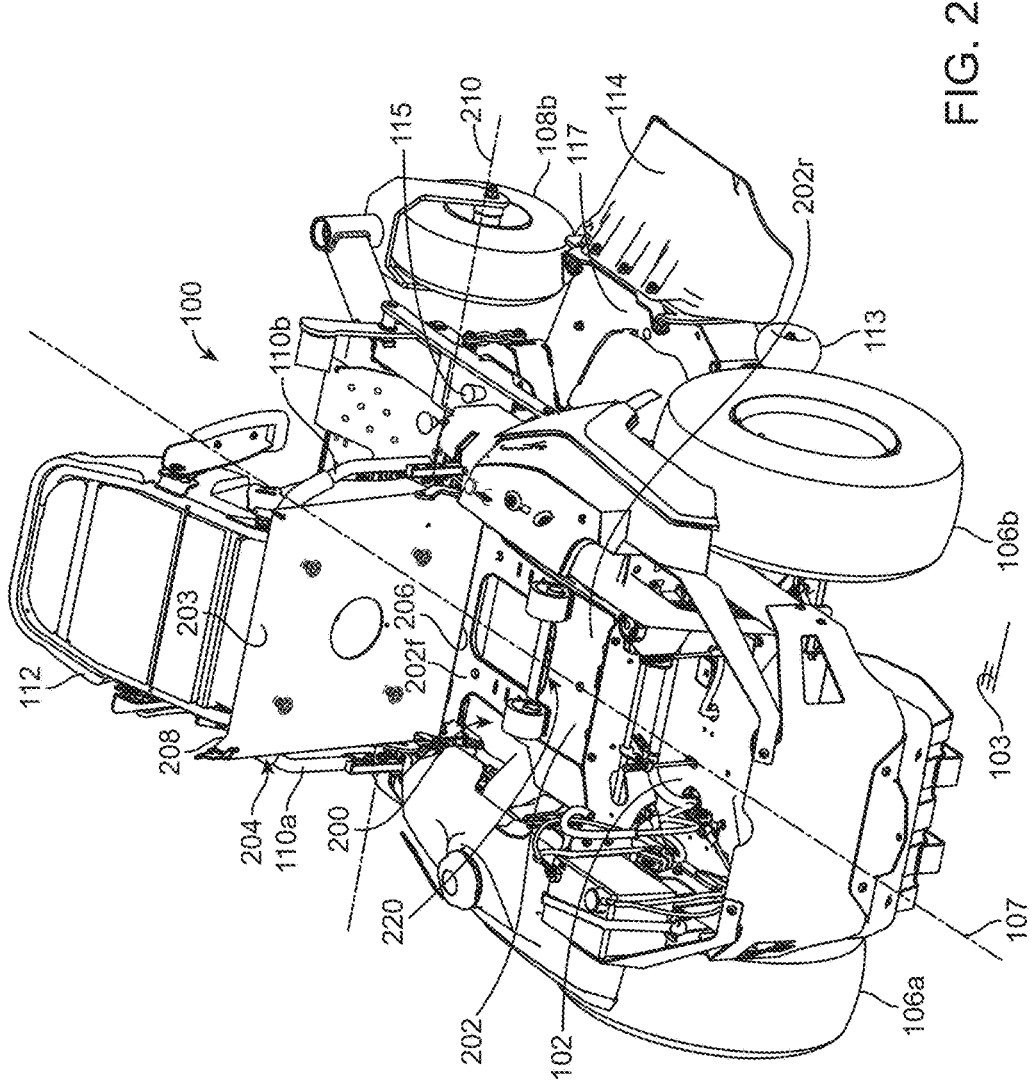
FIG. 2 is a partial perspective view similar to FIG. 1, but showing the seat moved (e.g., pivoted about a pivot axis)
Figure 3:
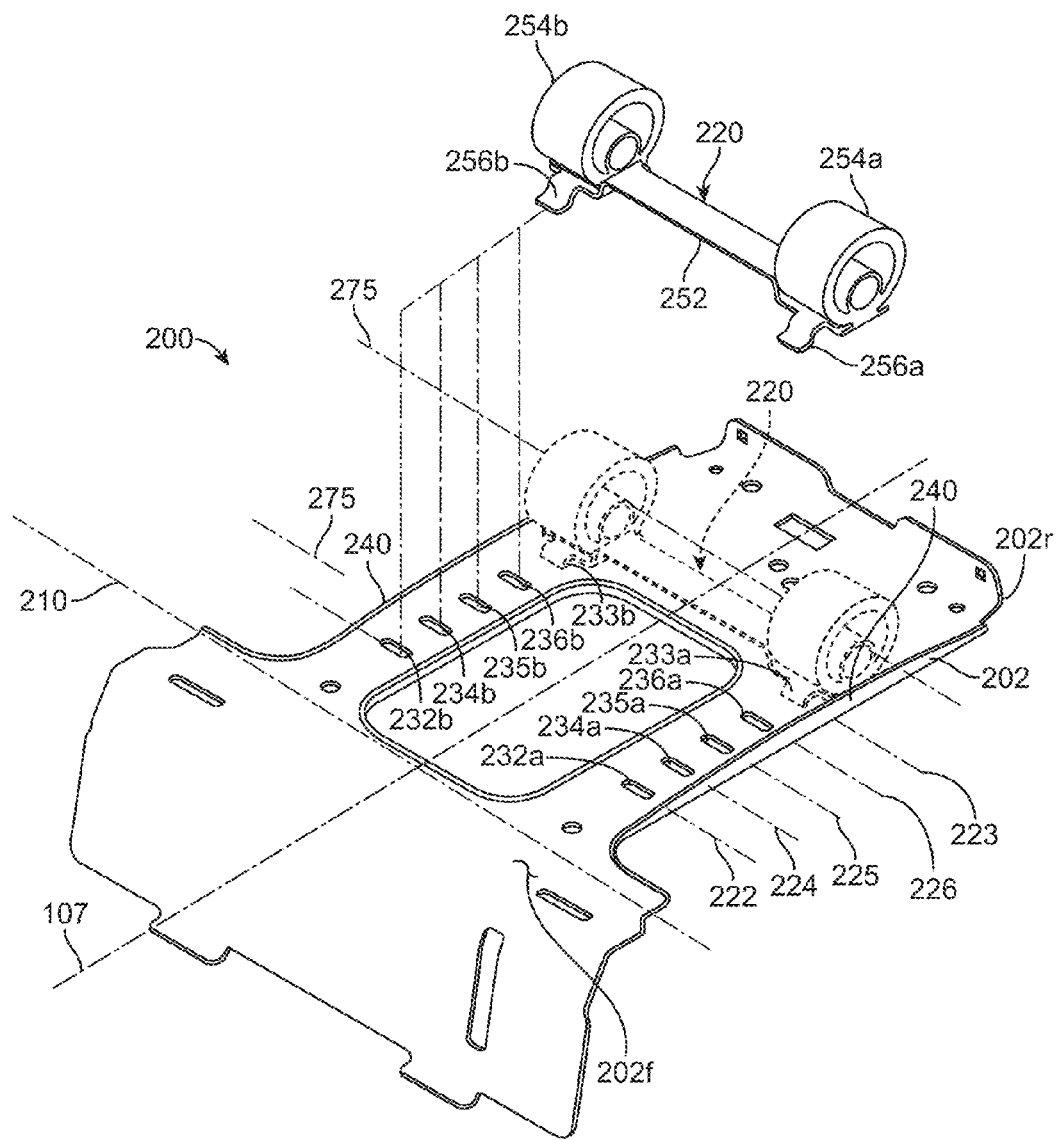
Figure 5:
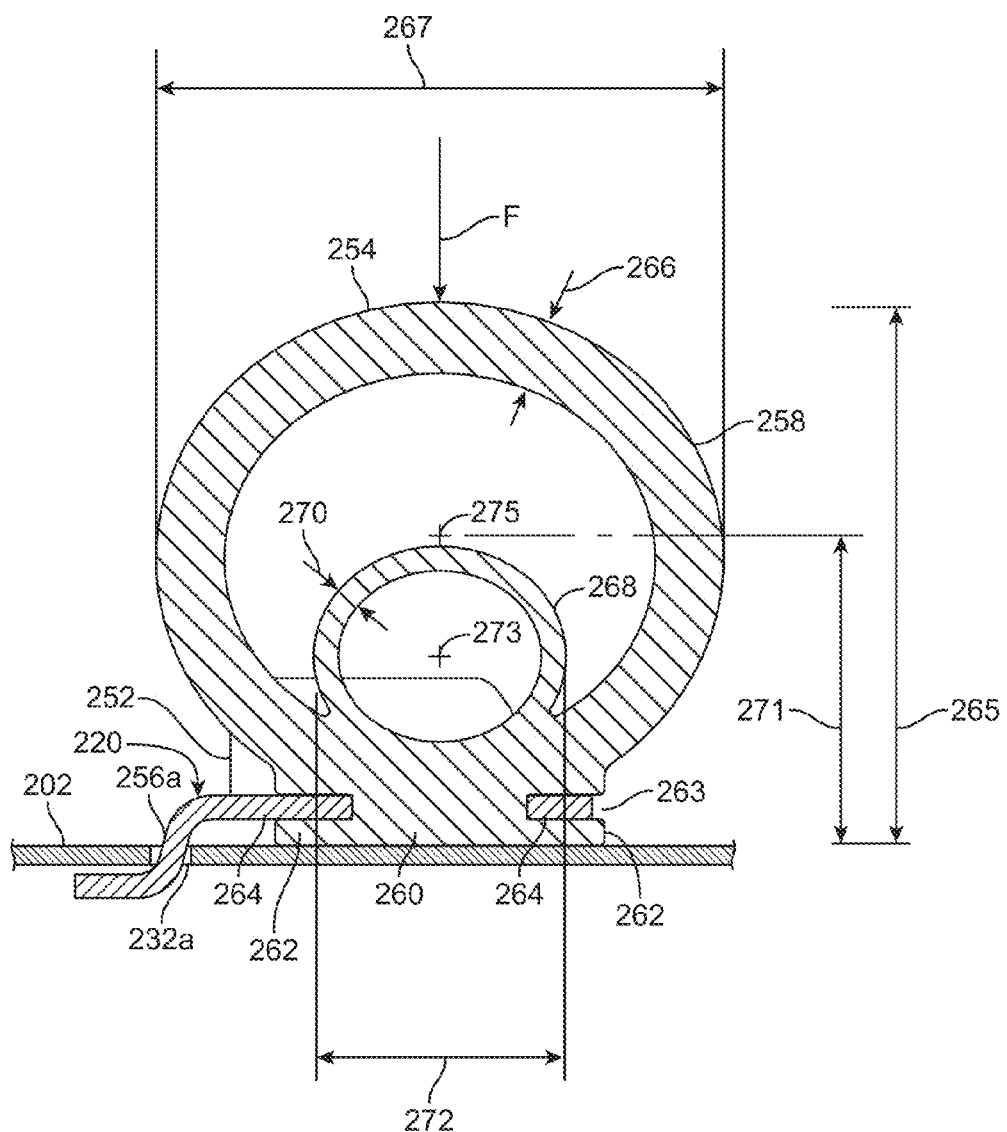
Figure 6:
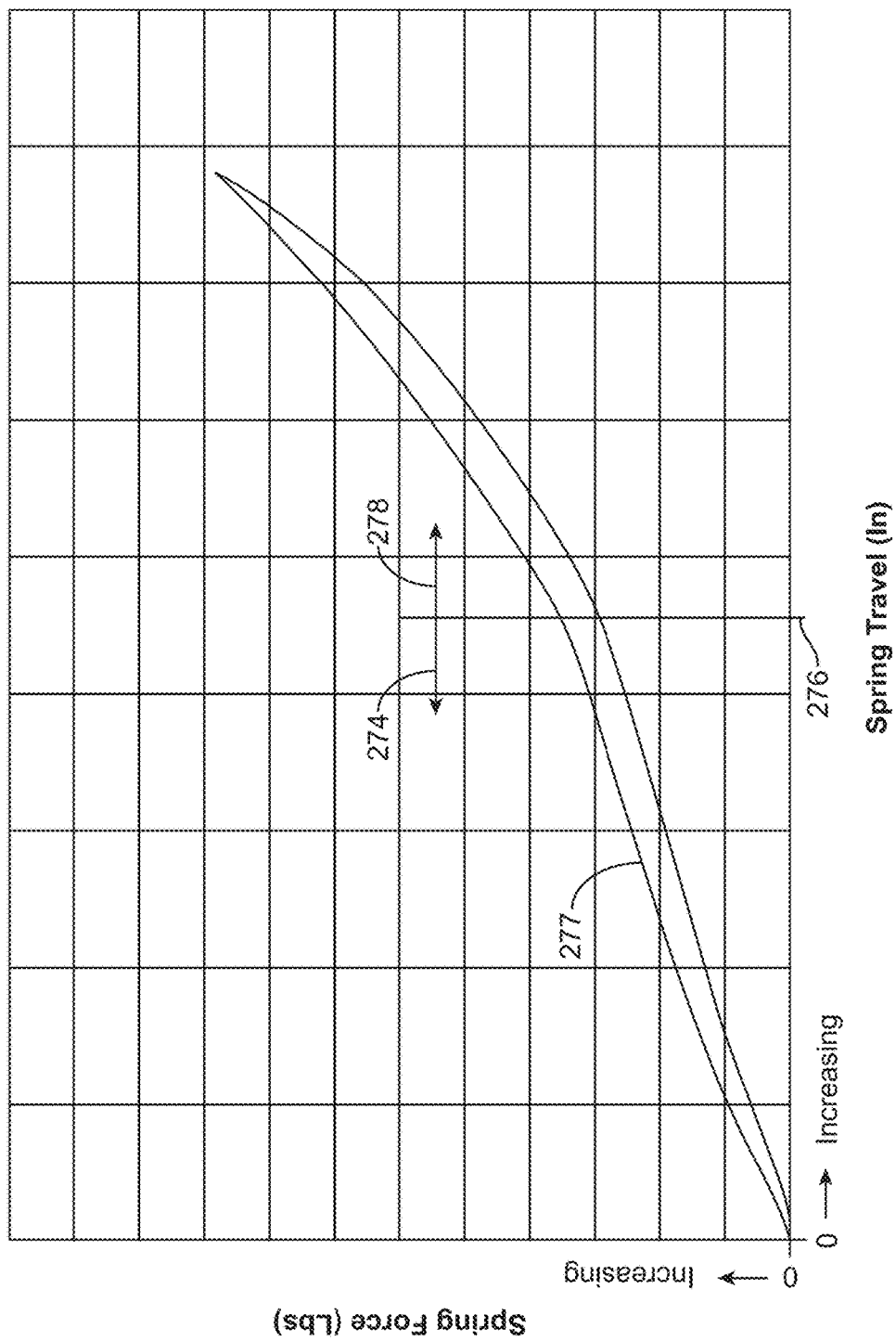
Figure 8:
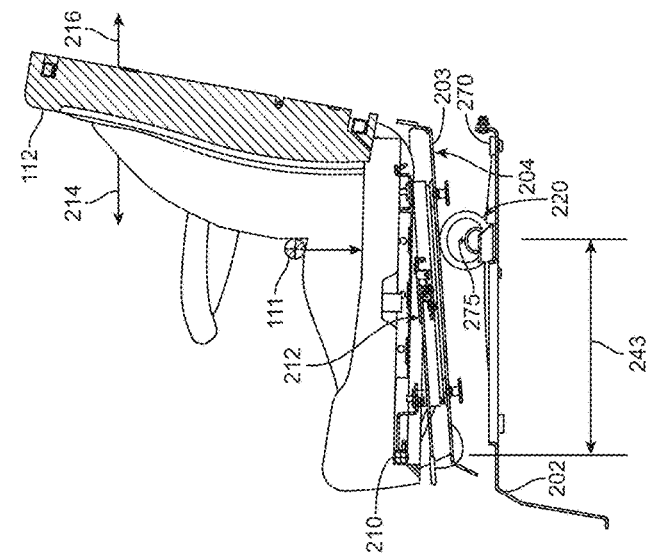
Figure 7:
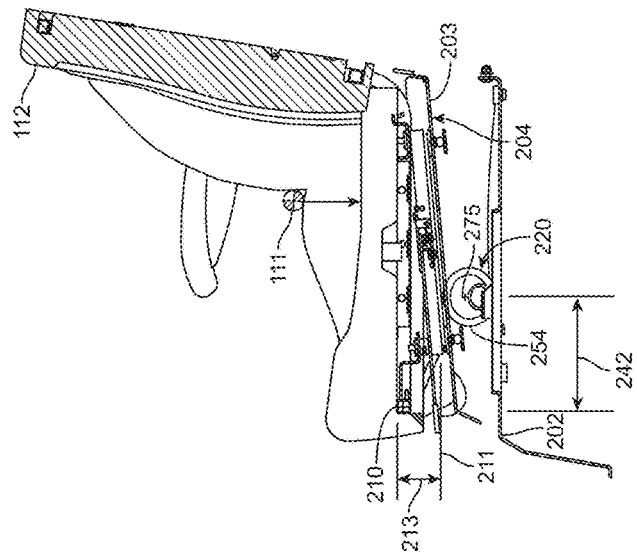

from a first operating position (as shown in FIG. 1) to a second raised or access position (FIG. 2), wherein the suspension system is shown having a suspension apparatus in accordance with embodiments of the present disclosure;

FIG. 3 is a partial perspective view of the vehicle of FIGS. 1 and 2, showing an isolated portion (e.g., support area) of a chassis of the vehicle, and the exemplary suspension apparatus;

FIGS. 4A-4C illustrate enlarged views of an exemplary suspension apparatus, wherein: FIG. 4A is a perspective view of the apparatus with a first resilient element shown exploded from a support member and a second resilient element shown attached to the support member; FIG. 4B is an opposite perspective view from that shown in FIG. 4A; and FIG. 4C is a perspective view similar to FIG. 4B, but with both resilient elements shown attached to the support member;

FIG. 5 is a section view of the suspension apparatus taken along line 5-5 of FIG. 4C;

FIG. 6 is a load versus deflection curve for a suspension apparatus in accordance with exemplary embodiments of the disclosure;

FIG. 7 is a partial section view taken through the seat, the view showing the suspension apparatus in a first discrete position minimally spaced from the pivot axis; and FIG. 8 is a section view similar to FIG. 7, but showing the suspension apparatus in a second discrete position maximally spaced from the pivot axis.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Embodiments described and illustrated herein may be directed to a suspension system and a turf maintenance vehicle incorporating the same. Vehicles in accordance with embodiments of the present disclosure may include suspension systems operatively located between an operator platform (e.g., seat) and a chassis of the vehicle. Such a suspension system may be configured to attenuate shock and/or vibrational forces that may otherwise be transmitted from the chassis to the platform (and thus to the operator). Moreover, suspension systems in accordance with embodiments of the present disclosure may provide adjustability of its attenuation or "stiffness" characteristics to accommodate varying operator weights and/or operator preferences. For example, in one embodiment, the suspension system may have at least two stiffness settings (e.g., three or more stiffness settings). Still further, these stiffness settings—at least in some embodiments—may be discrete rather than continuously variable.

With reference to the figures of the drawing, wherein like reference numerals designate like parts and assemblies throughout the several views, FIGS. 1 and 2 illustrate a turf maintenance vehicle in accordance with embodiments of the present disclosure. As used herein, a turf maintenance vehicle may include most any self-propelled vehicle adapted to provide a maintenance function to a turf surface. While shown as a riding, self-propelled, turf maintenance vehicle, e.g., a zero-radius-turning (ZRT) riding lawn mower 100 (also referred to herein simply as a "vehicle" or "mower"), such a configuration is not limiting. That is, while embodiments are described herein with respect to a riding mower, those of skill in the art will realize that embodiments of the present disclosure are equally applicable to other types of riding (e.g., stand-on) turf care products (e.g., aerators, spreader/sprayers, dethatchers, debris management systems (e.g., blowers, vacuums, sweeper, etc.), roto-tillers, and the like).

It is noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

An exemplary mower, although not necessarily central to an understanding of embodiments of the present disclosure, is now briefly described. FIGS. 1 and 2 illustrate the mower 100 having a chassis or frame 102 supporting a prime mover, e.g., electric motor or internal combustion engine 104 (the engine shown in FIG. 1 only). Left and right ground engaging drive members (e.g., wheels 106a, 106b) may be rotatably coupled to left and right sides, respectively, of a rear portion of the mower 100. The drive wheels 106 may be independently powered by the engine (e.g., via one or more hydraulic motors, transaxles, transmissions, or the equivalent) so that the drive wheels 106 may selectively propel the mower 100 over the ground surface 103 during operation.

One or more controls, e.g., left and right drive control levers 110 (e.g., 110a, 110b) may also be provided. The drive control levers 110 are generally pivotally coupled to the mower such that they may pivot forwardly and rearwardly (e.g., about a transverse axis) under the control of an operator located upon an operator platform, e.g., sitting in an operator seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. The mower 100 may further include various other mower controls (power take-off engagement, ignition, throttle, etc.).

In the illustrated embodiment, a pair of front swiveling caster wheels 108 (only right wheel 108b shown, but corresponding left wheel may be a mirror image thereof) may support a front portion of the mower 100 in rolling engagement with the ground surface 103 during operation. Of course, other drive configurations (e.g., actively steered front and/or rear wheels, tri-wheel configurations) and vehicle using drive members other than wheels (e.g., tracks), are certainly contemplated within the scope of this disclosure.

A lawn mower cutting deck 114 may be mounted to the lower side of the frame 102, e.g., generally between the drive wheels 106 and the caster wheels 108. The cutting deck 114 may include a deck housing 117 that partially defines an enclosed cutting chamber. The cutting chamber may partially surround one or more rotatable cutting blades (not shown) each attached to a rotatable blade spindle assembly of the deck. In other embodiments, reel-type cutting elements may be employed. Moreover, while illustrated as a belly-mount deck, other mower configurations may, alternatively or in addition, utilize an out-front or rear (e.g., towed) deck.

During operation, power is selectively delivered to the cutting deck 114 (e.g., to the spindle assemblies) and the drive wheels 106, whereby the cutting blades rotate at a speed sufficient to sever grass and other vegetation as the deck passes over the ground surface 103 (e.g., as the mower moves forwardly in a direction parallel to a longitudinal axis 107 of the mower). Typically, the cutting deck 114 further has an operator-selectable height-of-cut control system 115 to allow deck height adjustment relative to the ground surface 103. The cutting deck 114 may optionally include anti-scalp rollers 113 to assist in reducing blade/ground contact.

With this general overview, an embodiment of an exemplary suspension system 200 for use with the mower 100 will now be described, initially with reference to FIG. 2 (note that some structure (e.g., engine 104 and ROPS structure) that is shown in FIG. 1 is removed in FIG. 2 to better illustrate aspects of the exemplary suspension system). As shown in this figure, the chassis 102 may define or otherwise include a support area 202. In the illustrated embodiment (see FIGS. 2 and 3), the support area 202 forms at least a generally horizontal structure positioned below the seat 112 during mower operation. The support area 202 may include a front end or portion 202f, a rear end or portion 202r, and a longitudinal axis (for purposes of this description, the longitudinal axis of the support area will be considered parallel or even equivalent (e.g., co-axial) with the longitudinal axis 107 of the mower 100 (see, e.g., FIG. 1)) extending between the front and rear ends.

The system 200 may further include an operator platform 204 adjacent (e.g., above) the support area 202 (when the seat is in the operating position of FIG. 1). In one embodiment, the platform 204 may include a base 203 and the seat 112 (attached to the base) as indicated in FIG. 2. As further shown in FIG. 2, the platform 204 may include a first (e.g., front) edge 206 proximate the front end 202f of the support area 202, and a second (e.g., rear) edge 208, the latter spaced-apart from the former along the longitudinal axis 107 (again, when the platform/seat is in the operating position). The platform (e.g., the front edge 206 of the platform) may be pivotally connected to the chassis 102 (e.g., to the support area 202) at a pivot axis 210 that, in one embodiment, is both: transverse to the longitudinal axis 107 of the mower/operator platform 204 (e.g., parallel to the front edge 206); and proximate the front end 202f of the support area 202. The pivot axis 210 may allow the operator platform 204 (seat 112) to pivot about the pivot axis from an operating position (see FIG. 1) to, for example, an elevated access position (see FIG. 2). While shown as being near the front end 202f of the support area, the pivot axis 210 could, in other embodiments, be located elsewhere, e.g., behind the seat 112 or otherwise near the rear end 202r of the support area.

As used herein, "longitudinal axis" refers to an axis of the mower 100 or portion of the mower (e.g., the support area 202) that extends in a direction parallel to the mower's primary operating direction (e.g., front-to-rear). Similarly, a "transverse axis" refers to any axis that is orthogonal to the longitudinal axis, i.e., a transverse axis would be any axis normal to a vertical plane containing the longitudinal axis. Accordingly, longitudinal direction or distance refers to a direction measured along the longitudinal axis, while transverse direction or distance refers to a lateral direction measured along a transverse axis.

With reference now to FIGS. 2, 3, and 4A-4C, the suspension system 200 may further include a suspension apparatus 220. In one embodiment, the suspension apparatus 220 is selectively attachable to the support area 202 of the chassis (or, alternatively, attachable to the operator platform 204) at either a longitudinal first location 222 or a longitudinal second location 223 (see, e.g., FIG. 3). In the first location 222, the suspension apparatus 220 is positioned (spaced-apart) from the pivot axis 210 (e.g., positioned from a vertical plane that contains the pivot axis 210 as shown in FIG. 7) by a first distance 242 while, in the second location 223, the suspension apparatus is positioned from the pivot axis by a second distance 243 (see FIG. 8) different than the first distance 242. While described as having two locations defining two corresponding distances, embodiments accommodating any plurality of locations/distances (e.g., three or more discrete locations, or, in one embodiment, five discrete locations including locations 224, 225, and 226 as shown in FIG. 3) of the suspension apparatus 220 are possible.

The suspension apparatus 220 may include a support member 252 and one or more resilient elements 254 (e.g., two elements 254a, 254b) attached, or otherwise connected, to the support member as indicated in FIGS. 3 and 4A-4C. The support member 252 may form an elongate structure configured to extend transversely to the longitudinal axis 107 (e.g., be parallel to the pivot axis 210) when the suspension apparatus 220 is in any of its potential locations (e.g., first location 222 or second location 223) as indicated in FIG. 3. While described herein as including a support member and two resilient elements, other configurations (e.g., only one resilient element and no support member) are possible without departing from the scope of this disclosure.

The support member 252 may include opposite or outermost first and second ends, wherein each end is operable to receive one of the resilient elements 254 as shown in the figures. In the illustrated embodiments, the suspension apparatus 220 includes two resilient elements 254a, 254b wherein each forms a tubular element as shown. However, those of skill in the art will realize that other cross-sectional shapes (e.g., solids) may also be used as long as the shape and material properties of the resilient elements achieve the desired suspension attenuation/damping characteristics.

In one embodiment, the suspension apparatus 220 is attachable to the support area 202 of the chassis 102 as shown in broken lines in FIG. 3. To permit such attachment, the support area may define two or more pairs of slots (e.g., pair 232 (having transverse slots 232a and 232b) corresponding to the first location 222, and a pair 233 (having slots 233a and 233b) corresponding to the second location 223). In the illustrated embodiment, each slot of each pair of slots may be positioned at the same longitudinal location as shown (e.g., each slot of each pair of slots may be parallel to one another such that they lie along a common transverse slot axis), and may, at least in one embodiment, be located on opposite sides of, and equidistant from, the longitudinal axis 107 as shown in FIG. 3.

Each pair of slots (e.g., each pair 232, 233, 234, 235, and 236) is adapted to selectively and simultaneously receive therein respective couplers which may, in one embodiment, take the form of tabs 256 (e.g., left tab 256a received into left slot 232a, right tab 256b received in right slot 232b, etc.) formed on the support member 252 (of the suspension apparatus 220). The tabs 256 may be shaped or "stepped" (see also FIG. 5) so that insertion of the tabs into their respective slots (e.g., slots 232) requires initially tilting the suspension apparatus (e.g., 90 degrees counterclockwise from the position shown in FIG. 5) to first engage the tabs with their respective slots. Once the tabs 256 are inserted into the slots 232, the entire suspension apparatus 220 may be rotated (in a clockwise direction in FIG. 5) until the apparatus seats upon, and secures to, the support area 202 as shown (see also FIGS. 2 and 3). While shown as providing two tabs on the support member and two corresponding slots on the support area, such a configuration is not limiting as embodiments with a single tab/slot, as well as embodiments with three or more tabs/slots, are certainly possible. Furthermore, while shown as laterally spaced, the tabs/slots could be oriented longitudinally. For example, the support area 204 may contain a plurality of centrally located, transversely-extending slots spaced along the longitudinal axis. The support member 252, which could be configured to extend longitudinally, could then engage any two (or more) of the various slots to obtain the desired longitudinal positioning.

As one can appreciate, when the suspension apparatus 220 is attached to the support area 202 (or, alternatively, to the platform 204) at any one of the discrete locations provided by the slots 232, 233, 234, 235, and 236 and the platform is in the operating position (see FIG. 1), the resilient element(s) 254 are located or otherwise interposed between the support area and the platform.

As shown in FIGS. 4A-4C and 5, each resilient element 254 may, in one embodiment, form a tubular body 258 and a base 260. The base 260 may, in one embodiment, form or otherwise include ears 262 that define cutouts or notches 263 operable to receive therein corresponding rails 264 of the support member 252. As a result, in some embodiments, the resilient elements 254 may assemble to the support member 252 by simply sliding onto opposite ends of the support member, after which they are held in place solely by frictional engagement. In such an embodiment, retention members (e.g., fasteners) may not be required. However, supplemental retention, (e.g., fasteners, adhesives, etc.) may optionally be provided to more positively secure the resilient elements 254 to the support member 252. In some embodiments, the support area 202 (or the operator platform 204) may include features that assist in retaining the resilient elements 254 in place. For example, as shown in FIG. 3, the support area 202 may include flanges 240 (along each side as shown) adapted to maintain attachment of the resilient elements 254 to the support member 252 when the suspension apparatus 220 is attached to the support area 202 and the platform is in the operating position.

The configuration provided by the ears 262 also ensures that the resilient elements 254 (e.g., the base 260) form a primary contact portion (i.e., the resilient elements themselves (not the metal support member 252) contact both the platform and the support area) between the suspension apparatus 220 and the support area 202/platform as shown in FIG. 5. Such a configuration may better attenuate the transmission of forces (and noise) between the support area 202 and the operator platform 204 as opposed to direct "metal-on-metal" contact.

FIG. 5 illustrates a section view of the suspension apparatus 220 taken along line 5-5 of FIG. 4C. As shown in this view, each tubular body 258 may, when undeflected, be round (e.g., circular), oval, or ovoid in shape when viewed along a tube axis 275. The size, geometry, and material of each resilient element 254 may be selected to provide desirable load-deflection characteristics that, through selective positioning of the apparatus 220, may provide desirable shock absorbing characteristics for a range of operator weights. The material properties, wall thickness, and diameter of the body 258 of each resilient element may be selected to provide, for example, 1-2 inches (in), e.g., 1.5 in, of deflection when exposed to a static load of 450 pounds-force (lbf). To achieve such characteristics, the body 258 of each resilient element 254 may, in one configuration, be made of an injection-molded thermoplastic elastomer such as TECSPAK (available from Miner Elastomer Products Corp. of Geneva, Ill., USA). Moreover, each resilient element 254 may have a wall thickness 266 of 0.2-0.5 in (e.g., 0.3 in), a height 265 of 3-3.2 in, a width 267 of 3-3.3 in, and a depth 269 (see FIG. 4B) of 1.8-2.2 in (e.g., 2 in).

As further shown in FIG. 5, each resilient element 254 may further include a secondary resilient body 268, e.g., which may be tubular, contained within an interior cavity formed by the body 258. As shown in this figure, the secondary resilient body 268 may be integrally formed with the resilient element 254 (e.g., with the body 258 and base 260). However, embodiments wherein the secondary resilient body is independent of the resilient element 254 are also contemplated.

The secondary resilient body 268 may have a wall thickness 270 of 0.1-0.2 in (e.g., 0.14 in), a height 271 of 1.6-1.8 in, a width 272 of 1.3-1.5 in, and a depth 269 (see FIG. 4B) of 1.8-2.2 in (e.g., 2 in). Moreover, the secondary resilient body 268 may form a tubular cross-sectional shape (e.g., round, oval, ovoid) similar to the body 258 and may, at least in some embodiments, have a tube axis 273 parallel to, but offset from (e.g., eccentric to), the tube axis 275 of the body 258. While other configurations are certainly possible, the axes 275 (as well as the axes 273) may be coaxial for both resilient elements 254 (e.g., the two resilient elements may share both a common tube axis 273 and a common tube axis 275) when the suspension apparatus 220 is attached to the support area. Moreover, both the common tube axis 273 and the common tube axis 275 may be parallel to the pivot axis 210.

As one can appreciate, a construction like that shown in FIG. 5 may allow the body 258 alone to initially absorb a load F. However, once the body 258 reaches a predetermined threshold deflection or compression magnitude, e.g., 0.9-1 in, an inner surface of the body 258 may abut a top surface of the secondary resilient body 268, wherein further loading is reacted by both the body 258 and the secondary resilient body 268.

FIG. 6 illustrates an exemplary static load ("spring" force) versus deflection ("spring" travel) curve 277 for the exemplary suspension apparatus 220 having resilient elements 254 configured as shown in FIG. 5. As shown in this view, the resilient elements 254 may provide a first slope for a first portion 274 of the load-deflection curve. However, as the resilient elements 254 reach the predetermined threshold deflection 276, the curve may change slope (e.g., the load-deflection curve of the resilient element 254 may transition to a second slope, different than the first slope) as shown by second portion 278 of the load-deflection curve in FIG. 6. Once again, this transition may result from contact between the body 258 and the secondary resilient body 268. As a result, the resilient elements 254 may provide greater stiffness as they approach their maximum intended deflection. Such a construction may reduce the chances of over-compression of the resilient elements 254, or of the seat "bottoming out" on the support area 202. As FIG. 6 also shows, the construction of the resilient element 254 may provide some damping (see, e.g., upper curve in FIG. 6 illustrates force-deflection during compression of the resilient elements 254, while the lower curve illustrates decompression of the resilient elements). This damping effect may result from the elastomeric material used and the overall (e.g., tubular) geometry of the resilient elements.

While shown as providing stiffness variation through an integral, secondary resilient body, such a configuration is not limiting as most any element, integral or separate, may be used to alter the stiffness characteristics of the suspension apparatus 220. For example, other embodiments may provide a separate secondary element between the operator platform and the support area that is not contacted until the resilient elements 254 reach a specific deflection threshold. This secondary element may behave in a manner similar to the secondary resilient bodies 268 described above (e.g., it could shift the slope of the load-deflection curve as shown in FIG. 6), or it could function as a more rigid stop. As an example of the latter, a rubber or plastic button 270 (see, e.g., FIG. 8) may be provided to limit the maximum deflection of the resilient elements 254. In still other embodiments, the wall thickness (see, e.g., 266, 270 in FIG. 5) of one or both of the resilient body 258 and secondary resilient body 268 may be variable as opposed to the constant thicknesses illustrated in FIG. 5. Such variation may allow advantageous tuning of the load-deflection curve. For example, variation in the wall thickness 266 of the body 258 may allow desirable load-deflection characteristics without the need for the secondary resilient body 268.

With reference again to FIG. 3, the suspension apparatus 220 may be movable relative to the chassis 102 (e.g., relative to the support area 202) to alter the stiffness characteristics of the suspension system 200. For example, as shown in FIG. 3, the suspension apparatus 220 may be placed in the first location 222 (e.g., the tabs 256 of the support member 252 may be engaged with the slots 232), the second location 223 (tabs 256 engaged with slots 233) as shown in the broken line representation, or in any intermediate location (using the slots 234, 235, and 236). Such adjustment may be achieved by, once again, manually moving the suspension apparatus 220 to the appropriate slots that provide the desired suspension characteristics.

FIG. 7 illustrates the suspension apparatus 220 located in the first or most forward location 222 (e.g., inserted into the slots 232 of FIG. 3 such that the suspension apparatus (e.g., the common tube axis 275) is spaced-apart from the pivot axis 210 (e.g., from a vertical plane containing the pivot axis) by the first distance 242). In this position, the suspension apparatus is located forward of a seat index point (SIP) 111 of the seat 112. FIG. 8, on the other hand, illustrates the suspension apparatus 220 located in the second or most rearward location 223 (e.g., inserted into the slots 233 of FIG. 3) such that the suspension apparatus (e.g., the common tube axis 275) is spaced-apart from the pivot axis 210 by the second distance 243. In this position, the suspension apparatus is located near the SIP 111 of the seat 112 (both FIGS. 7 and 8 assume that the seat 112 is in the same position relative to the base 203 of the operator platform 204).

In some embodiments (see e.g., FIG. 7), the pivot axis 210 may be positioned vertically above a horizontal plane 211 defined by contact between at least one of the resilient elements 254 and a lower surface of the operator platform 204 (e.g., above a horizontal plane that is tangent to an uppermost surface of one of the resilient elements both: when the seat/operator platform is in the operating position (as shown in FIG. 7); and before an external seat load is applied (e.g., before an operator sits in the seat)). For instance, in some embodiments, the pivot axis 210 may be spaced above the plane 211 by a distance 213 of about 1-2 inches, e.g., 1.7 inches when the suspension apparatus is positioned in the first location as shown in FIG. 7. By placing the pivot axis at this relative position (e.g., forwardly and upwardly from the resilient element 254), the suspension motion experienced by the operator (due to the pivoting movement of the seat 112) may be generally vertical over the expected range of seat suspension travel. Of course, other embodiments may position the pivot axis elsewhere (e.g., closer to, or farther away, from the plane 211, or even below the plane) without departing from the scope of this disclosure.

As one can appreciate, the embodiment of FIG. 7 may magnify the compressive force exerted on the suspension apparatus 220 as compared to the compressive force applied by the same operator if the suspension apparatus were in the configuration illustrated in FIG. 8. Stated alternatively, by moving the suspension apparatus 220 among the available positions (see FIG. 3), desirable compressive loading on the suspension apparatus may be achieved even with operators of varying weight. For instance, a lighter operator may place the suspension apparatus 220 as shown in FIG. 7 and would observe generally similar suspension characteristics as a heavier operator (assuming traversal of the same terrain) might experience when the suspension apparatus is positioned as shown in FIG. 8. Of course, operators of intermediate weight may select any of the locations between those illustrated in FIGS. 7 and 8 to achieve similar results. Moreover, movement of the suspension apparatus 220 among the available positions may allow a specific operator to achieve a suspension stiffness more suited to his or her particular preferences. For example, a lighter operator may place the suspension apparatus 220 at one of the more rearward locations if he or she prefers a stiffer ride than a typical operator of similar weight.

In some embodiments, the support area 202 (see FIG. 3) may include indicia to provide the operator with a relative indication of where he or she may wish to locate the suspension apparatus 220. While most any indicia are possible, in one embodiment, a simple relative indication (e.g., "heavy" marked near slots 233 and "light" marked near slots 232) of suspension stiffness may suffice.

In the illustrated embodiments, the seat 112 may also be longitudinally adjustable relative to the base 203 of the operator platform 204, e.g., the platform may include an adjustment mechanism 212 (see FIG. 8) that permits positional adjustment (e.g., longitudinally) of the seat relative to the base 203 (e.g., to the chassis). For example, the mechanism 212 may allow the seat 112 to move forward (e.g., in the direction 214 in FIG. 8) and rearward (e.g., in the direction 216 in FIG. 8) relative to the base 203/chassis (and relative to the pivot axis 210) along the longitudinal axis. Of course, this adjustment may alter the location of the SIP 111, which may influence the desired location of the suspension apparatus 220.

Using a mower 100 and suspension system 200 as described and illustrated herein, two very different operators (e.g., operator A weighing (e.g., applying a seat load of) 120 pound-force and operator B weighing (e.g., applying a seat load of) 300 pound-force) may each achieve desirable suspension characteristics. For instance, operator A may position the seat 112 and the suspension apparatus 220 as shown in FIG. 7 (e.g., wherein the distance 242 in FIG. 7 is 6.4 inches and a normal distance between the pivot axis and SIP vector is 8.5 inches), while operator B may position the seat and suspension apparatus as shown in FIG. 8 (e.g., wherein the distance 243 in FIG. 8 is about 12.6 inches and a normal distance between the pivot axis and the SIP vector is 12.5 inches). In each instance, the suspension apparatus (e.g., the bodies 258 of the resilient elements 254) would provide an initial static vertical deflection (at the SIP 111) of 0.5 inches. By providing this initial compression, each operator may experience the benefit of suspension even when the mower 100 is stationary.

Moreover, in both instances, when the vehicle is subjected to a 4 g dynamic vertical shock load (as may be experienced when exposed to a ground impact/undulation), the two operators may experience a similar overall or total vertical deflection (measured at the SIP) of about 1.5 inches (i.e., one inch more than static deflection). As a result, generally the same desired suspension system characteristics may be available to a broad spectrum of operators. Of course, the actual suspension system load curve for any particular operator would depend on the specific seat 112 (as controlled by the adjustment mechanism 212) and suspension apparatus 220 locations. Moreover, operators between these two weight limits may locate the suspension apparatus at an intermediate location as permitted by the slots 234, 235, and 236) to achieve similar static and dynamic suspension performance.

While not illustrated herein, additional suspension apparatus 220 (e.g., one near the front of the support platform and one near the rear) may be simultaneously provided where beneficial for a particular vehicle application.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A riding turf maintenance vehicle comprising:
   a chassis comprising a support area, the support area having a front end, a rear end, and a longitudinal axis extending between the front and rear ends;
   an operator platform comprising first and second edges spaced-apart from one another along the longitudinal axis, wherein the platform is pivotally connected to the chassis at a pivot axis; and
   a suspension apparatus selectively attachable, either to the support area or to the platform, at a first location or, alternatively, a second location, wherein the suspension apparatus comprises:
      a support member comprising couplers adapted to attach to either the support area or the platform at a first position or, alternatively, at a second position, wherein the first position and the second position correspond to the first location and the second location, respectively, of the suspension apparatus; and
      two resilient elements attached to the support member such that, when the suspension apparatus is attached to the support area or to the platform and the platform is in an operating position, the resilient elements are interposed between the support area and the platform, wherein the resilient elements are spaced-apart from the pivot axis: by a first distance when the suspension apparatus is in the first location; and by a second distance, different than the first distance, when the suspension apparatus is in the second location.

2. The vehicle of claim 1, wherein the support member forms an elongate structure extending transversely to the longitudinal axis when the suspension apparatus is in either the first location or the second location.

3. The vehicle of claim 1, wherein the suspension apparatus is adapted to attach to the support area of the chassis such that the resilient elements contact both the platform and the support area when the platform is in the operating position.

4. The vehicle of claim 1, wherein the pivot axis is proximate the front end of the support area.

5. The vehicle of claim 1, wherein the support area of the chassis defines two or more pairs of transverse slots, each slot of each pair of slots being parallel to the other, and each pair of slots adapted to simultaneously receive therein the couplers of the support member.

6. The vehicle of claim 5, wherein a first pair of transverse slots corresponds to the suspension apparatus being in the first location, and a second pair of transverse slots corresponds to the suspension apparatus being in the second location.

7. The vehicle of claim 1, wherein the operator platform comprises a base and a seat.

8. The vehicle of claim 7, wherein the operator platform further comprises an adjustment mechanism adapted to permit positional adjustment of the seat relative to the base.

9. The vehicle of claim 1, wherein the support member forms an elongate structure having a first end and a second end and the two resilient elements comprise a first tubular element attached to the first end; and a second tubular element attached to the second end.

10. The vehicle of claim 9, wherein each of the first and second tubular elements are circular, oval, or ovoid in shape when viewed along a tube axis.

11. The vehicle of claim 1, wherein each of the two resilient elements comprises a tubular body defining an interior cavity containing therein a secondary resilient body.

12. The vehicle of claim 11, wherein the tubular body is integrally formed with the secondary resilient body.

13. The vehicle of claim 9, wherein the each of the first and second tubular elements defines notches that slidingly receive therein corresponding rails of the first and second ends of the support member, respectively, and wherein the support area or the platform comprises one or more flanges adapted to maintain engagement of the resilient elements to the support member when the platform is in the operating position.

14. A riding turf maintenance vehicle comprising:
a chassis comprising a support area having a front end, a rear end, and a longitudinal axis extending between the front and rear ends;
an operator platform comprising a seat positioned above the support area when the platform is in an operating position, the platform further comprising: a front edge located proximate the front end of the support area, wherein the front edge of the platform is pivotally connected to the support area at a pivot axis parallel to the front edge such that the platform may pivot about the pivot axis; and
a suspension apparatus selectively attachable to the support area at any one of a plurality of discrete locations comprising at least a first and a second location, wherein the suspension apparatus comprises:
an elongate, transversely extending support member comprising a tab, the tab adapted to engage the support area to secure the suspension apparatus at any one of the plurality of discrete locations, wherein each of the plurality of discrete locations is defined by a slot formed in the support area, and wherein each slot is adapted to receive therein the tab of the support member; and
resilient first and second tubular elements attached to outermost ends of the support member, the first and second tubular elements defining a transverse, common tube axis that is also parallel to the pivot axis, wherein, when the suspension apparatus is attached to the support area at any one of the plurality of discrete locations and the platform is in the operating position, the first and second tubular elements are interposed between the support area and the platform,
and wherein the common tube axis of the first and second tubular elements is spaced-apart from the pivot axis: by a first distance when the suspension apparatus is in the first location; and by a second distance, different than the first distance, when the suspension apparatus is in the second location.

15. The vehicle of claim 14, wherein the plurality of discrete locations comprises at least three discrete locations.

16. The vehicle of claim 14, wherein the first and second tubular elements each define a body forming an interior cavity, each cavity containing therein a secondary tubular body.

17. The vehicle of claim 16, wherein each secondary tubular body defines a tube axis parallel to the common tube axis.

18. The vehicle of claim 17, wherein each secondary tubular body is adapted to abut the body of its respective tubular element upon the tubular element reaching a predetermined compression magnitude.

19. The vehicle of claim 14, wherein the platform further comprises an adjustment mechanism adapted to permit positional adjustment of the seat, relative to the chassis, along the longitudinal axis.

20. The vehicle of claim 14, wherein the pivot axis is positioned above a horizontal plane that is tangent to an uppermost surface of the first tubular element when both: the platform is in the operating position; and before an external seat load is applied.

21. The vehicle of claim 20, wherein the pivot axis is positioned 1-2 inches above the horizontal plane.

22. A riding turf maintenance vehicle comprising:
a chassis comprising a support area having a front end, a rear end, and a longitudinal axis extending between the front and rear ends;
an operator platform comprising a seat positioned above the support area when the platform is in an operating position, the seat defining a seat index point (SIP), the platform further comprising: a front edge located proximate the front end of the support area, wherein the front edge is pivotally connected to the support area at a pivot axis parallel to the front edge such that the platform may pivot about the pivot axis; and
a suspension apparatus comprising a resilient element, the apparatus attachable to the support area at a first location or, alternatively, at a second location, each location being at a different longitudinal distance from the pivot axis, wherein:
when the apparatus is in the first location with a 120 pound-force seat load, the suspension apparatus is adapted to provide a static vertical deflection, at the SIP, of 0.5 inches, and a total dynamic vertical deflection, at the SIP, of 1.5 inches when the vehicle is subjected to a vertical shock load of 4 g; and
when the apparatus is at the second location with a 300 pound-force seat load, the suspension apparatus is adapted to provide a static vertical deflection, at the SIP, of 0.5 inches, and a total dynamic vertical deflection, at the SIP, of 1.5 inches when the vehicle is subjected to a vertical shock load of 4 g.

23. The vehicle of claim 22, wherein the suspension apparatus is attachable to the support area at a third location intermediate the first and second location.

24. The vehicle of claim 22, wherein the first location is 6.4 inches from a vertical plane containing the pivot axis.

25. The vehicle of claim 22, wherein the second location is 12.6 inches from a vertical plane containing the pivot axis.

* * * * *